United States Patent
Nguyen et al.

(10) Patent No.: US 8,900,658 B2
(45) Date of Patent: Dec. 2, 2014

(54) METAL EFFECT PIGMENTS COATED WITH SIO₂, METHOD FOR PRODUCING SAID METALLIC EFFECT PIGMENTS AND USE

(75) Inventors: Phu Qui Nguyen, Mönchengladbach (DE); Pär Winkelmann, Rückersdorf (DE)

(73) Assignee: Eckart GmbH, Hartenstein (DE)

( * ) Notice: Subject to any disclaimer, the term of this patent is extended or adjusted under 35 U.S.C. 154(b) by 0 days.

(21) Appl. No.: 13/577,008

(22) PCT Filed: Feb. 4, 2011

(86) PCT No.: PCT/EP2011/000514
§ 371 (c)(1),
(2), (4) Date: Sep. 5, 2012

(87) PCT Pub. No.: WO2011/095341
PCT Pub. Date: Aug. 11, 2011

(65) Prior Publication Data
US 2013/0035400 A1 Feb. 7, 2013

(30) Foreign Application Priority Data
Feb. 5, 2010 (DE) .......................... 10 2010 007 147

(51) Int. Cl.
| | | |
|---|---|---|
| B05D 7/00 | (2006.01) | |
| C04B 14/04 | (2006.01) | |
| C04B 41/50 | (2006.01) | |
| C09D 11/00 | (2014.01) | |
| C09D 5/02 | (2006.01) | |
| C09C 1/64 | (2006.01) | |
| C09D 5/38 | (2006.01) | |
| C09D 5/03 | (2006.01) | |
| C09D 7/12 | (2006.01) | |
| C08K 9/02 | (2006.01) | |

(52) U.S. Cl.
CPC ................ C09C 1/642 (2013.01); C09D 5/028 (2013.01); C08K 9/02 (2013.01); C09D 5/38 (2013.01); C09D 5/032 (2013.01); C09D 7/1225 (2013.01); C01P 2004/51 (2013.01)
USPC ........ 427/215; 106/483; 106/287.1; 106/31.9

(58) Field of Classification Search
CPC ........ C09C 1/3684; C09C 1/642; C09C 1/62; C09C 1/3661; C09C 1/3081
USPC ........ 427/215; 106/483, 287.1, 31.9; 514/770
See application file for complete search history.

(56) References Cited

U.S. PATENT DOCUMENTS

| | | | |
|---|---|---|---|
| 2,885,366 A | 5/1959 | Iler | |
| 4,334,933 A | 6/1982 | Abe et al. | |
| 5,028,639 A | 7/1991 | Treutlein et al. | |
| 5,624,486 A * | 4/1997 | Schmid et al. ................ | 106/404 |
| 5,766,335 A | 6/1998 | Bujard et al. | |
| 5,931,996 A | 8/1999 | Reisser et al. | |
| 6,207,226 B1 | 3/2001 | Igarashi | |
| 7,172,812 B2 | 2/2007 | Greiwe et al. | |
| 7,300,510 B2 | 11/2007 | Seeger et al. | |
| 7,419,538 B2 * | 9/2008 | Li et al. ......................... | 106/403 |
| 7,651,562 B2 | 1/2010 | Kaupp et al. | |
| 2008/0087187 A1 | 4/2008 | Maul et al. | |
| 2008/0295737 A1 | 12/2008 | Henglein et al. | |
| 2010/0242789 A1 * | 9/2010 | Sano et al. ................... | 106/31.9 |

FOREIGN PATENT DOCUMENTS

| | | |
|---|---|---|
| CN | 1694929 A | 11/2005 |
| CN | 101287804 A | 10/2008 |
| CN | 101445675 A | 6/2009 |
| DE | 19820112 A1 | 11/1999 |
| DE | 10315715 A1 | 10/2004 |
| DE | 102007062942 A1 | 6/2008 |
| EP | 0259592 B1 | 3/1988 |
| EP | 1332714 A2 | 8/2003 |
| EP | 1619222 A1 | 1/2006 |
| EP | 1756234 B1 | 2/2007 |
| EP | 1953195 A1 | 8/2008 |
| JP | 55090561 | 7/1980 |
| JP | 11-116861 A | 4/1999 |
| JP | 2002088274 | 3/2002 |
| JP | 2003041150 | 2/2003 |
| JP | 2003147226 | 5/2003 |
| JP | 2004124069 | 4/2004 |
| JP | 2004124069 A | 4/2004 |
| JP | 2004131542 | 4/2004 |
| JP | 2008501050 A | 1/2008 |
| JP | 2009520844 A | 5/2009 |
| JP | 2010202709 | 9/2010 |
| JP | 2011137083 | 7/2011 |

(Continued)

OTHER PUBLICATIONS

Kiehl, et al., "Encapsulated aluminum pigments", Progress in Organic Coatings, 1999, pp. 179-183, vol. 37.
R.K. Iler, "The Chemistry of Silica" entitled Polymerization of Silica, Chapter 3, 1979, pp. 172-311.

*Primary Examiner* — Timothy Meeks
*Assistant Examiner* — Ann Disarro
(74) *Attorney, Agent, or Firm* — The Webb Law Firm

(57) ABSTRACT

The invention relates to a method for coating metallic effect pigments with silicon oxide, in which alkoxysilane(s) and/or silicon halide(s) in organic solvent are reacted with water in the presence of metallic effect pigments, where the reaction includes at least two steps, where (a) the reaction is carried out with addition of acid in a first step and with addition of base in a second step or where (b) the reaction is carried out with addition of base in a first step and with addition of acid in a second step. The invention further relates to the coated metallic effect pigments producible by way of the method of the invention, and also to the use thereof.

14 Claims, 1 Drawing Sheet

(56) References Cited

FOREIGN PATENT DOCUMENTS

| WO | 03095564 | A1 | 11/2003 |
| WO | 2004026268 | A2 | 4/2004 |
| WO | 2011080973 | A1 | 7/2011 |
| WO | 2011095341 | A1 | 8/2011 |

* cited by examiner

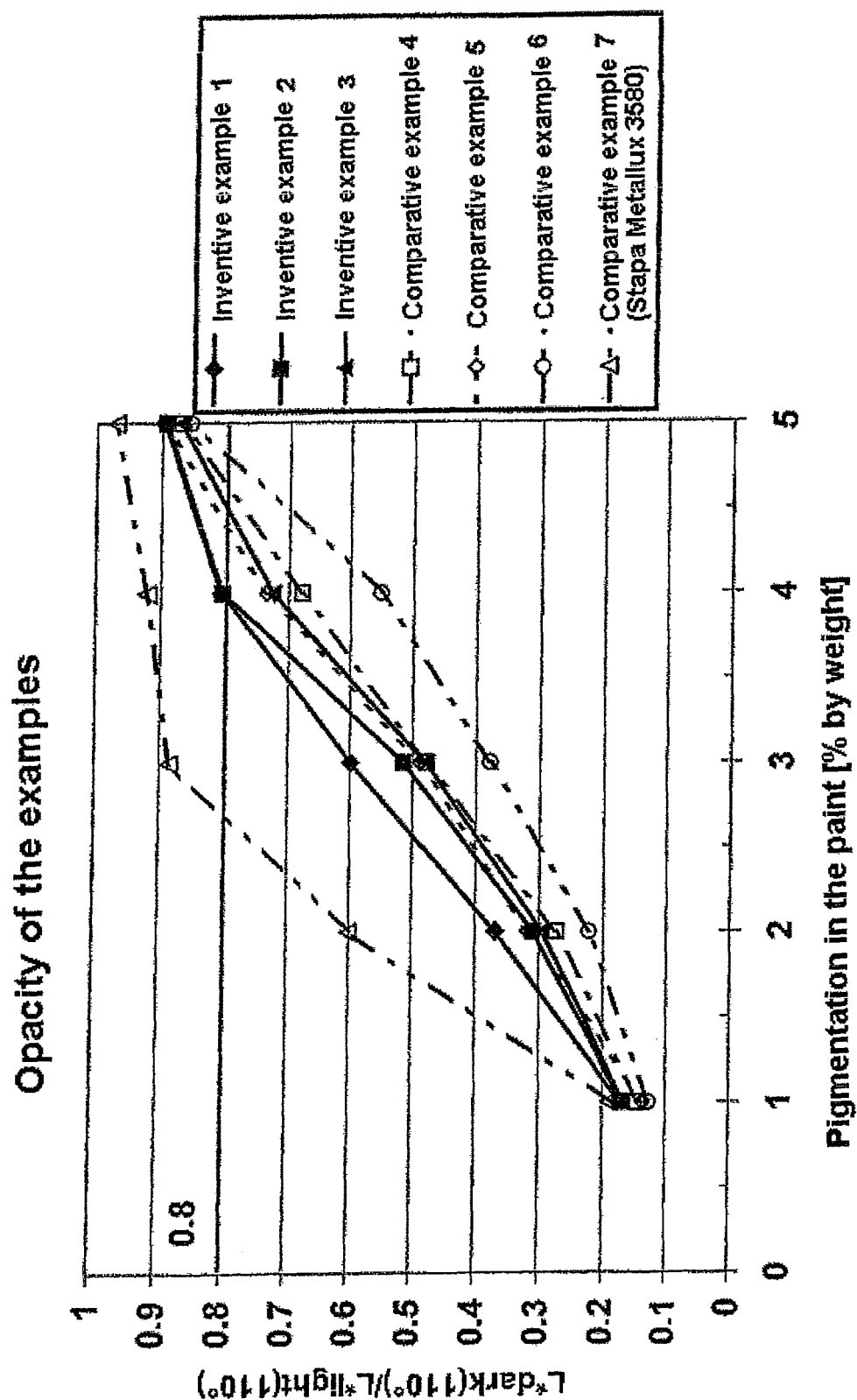

METAL EFFECT PIGMENTS COATED WITH SIO$_2$, METHOD FOR PRODUCING SAID METALLIC EFFECT PIGMENTS AND USE

BACKGROUND OF THE INVENTION

1. Field of the Invention

The present invention relates to a sol-gel method for producing aluminum effect pigments coated with silicon oxide, preferably SiO$_2$, with a corrosion-resistant coating for waterborne paints.

2. Description of Related Art

The meteoric rise in the use of eco-friendly waterborne paints in the automobile segment and in industrial coatings has necessitated the development of corrosion-protected metallic effect pigments. In the waterborne paints, which are given a basic formulation, the widespread aluminum effect pigments, in particular, exhibit a propensity toward oxidation, which produces hydrogen and leads to oxidization of the aluminum effect pigment. This oxidization results in a loss of specular gloss, such loss also being referred to as graying.

Very effectively corrosion-protected aluminum effect pigments are produced by the chromating process (EP 0 259 592) and are available from Eckart under the tradename Hydrolux®. These corrosion-protected aluminum effect pigments are notable for excellent gassing stability and outstanding opacity. Opacity, also called hiding power, is the surface area hidden per unit weight of pigment. The opacity of the chromated aluminum effect pigments is more particularly comparable with the opacity of the aluminum effect pigments prior to chromating.

A disadvantage is that the chromated aluminum effect pigments contain chromium compounds. Although chromated aluminum effect pigments do not contain any detectable amounts of the toxic Cr(IV), they are nevertheless not advantageous environmentally in view of the heavy metal content.

For this reason, SiO$_2$-coated aluminum or gold bronze effect pigments were developed. Coating with SiO$_2$ is accomplished preferably using the sol-gel process, in which, first of all, the aluminum or gold bronze effect pigments undergo sol-gel encapsulation, and subsequently a silicon dioxide coating is formed. The SiO$_2$-coated aluminum or gold bronze effect pigments have a high corrosion resistance, since the barrier effect of, the silicon dioxide coating prevents the migration of water or other corrosive substances at the pigment surface.

SiO$_2$ coating takes place via a gentle, eco-friendly sol-gel process which is catalyzed by bases (A. Kiehl, K. Greiwe *Progr. in org. Coatings* 37 (1999), 179-183). Commercially available metallic effect pigments SiO$_2$ coated using sol-gel processes are Hydrolan® (aluminum effect pigments) and Dorolan® (gold bronze effect pigments) from Eckart. Other commercially available SiO$_2$-coated aluminum effect pigments are, for example, Emeral® from Toyo, Japan, Aquamet® from Schlenk, Germany, and Silbercote® from Silberline, USA.

The gassing stability possessed by SiO$_2$-coated aluminum effect pigments is generally sufficient. By sufficient gassing stability is meant that under the influence of water there is generally no substantial evolution of hydrogen, since the aluminum is protected relatively effectively against attack by water. The gassing stability, however, is also dependent on the ambient conditions to which the aluminum effect pigment is exposed.

Occasionally, in the case of metallic effect pigments having a very fine particle-size band and a correspondingly large specific surface area, i.e. surface area per unit weight of metallic effect pigment, unwanted fluctuations may occur in the gassing stability. The opacity of the SiO$_2$-coated aluminum effect pigments known from the prior art, however, decreases markedly, as compared with the starting material and in comparison to chromated pigments.

For the coating of substrates with silicon dioxide there are two methods described in the prior art as being essential. The first method is the utilization of alkali metal silicates, which are converted into silanols by catalyzed hydrolysis before subsequently coalescing to form an inorganic network (R. K. Iler et al U.S. Pat. No. 2,885,366, 1959; R. K. Iler "The Chemistry of Silica", 1979).

The second method is the utilization of the sol-gel process, starting from alkoxysilanes, which are reacted under catalysis with water to form silanol and alcohol. In the conventional sol-gel coating of aluminum effect pigments using alkoxysilanes, the starting pigment in powder form is dispersed in an alcoholic phase and then the alkoxysilanes, water, and at least one basic or acidic catalyst are added with accompanying supply of heat.

The hydrolysis of tetraethoxysilane compounds is accompanied by formation of silanol structures of the composition Si(OH)$_{4-y}$(OCH$_2$CH$_3$)$_y$ (y=0-3), which are able to enter into polycondensation reactions. In the course of the reaction, a compact network of silicon dioxide develops on the surface of the pigment and completely encapsulates the pigment particles. Furthermore, the silicon dioxide coating freshly precipitated onto the pigment surface can be specifically subjected to further surface modifications. For example, silanes having at least one nonhydrolyzable substituent, examples being alkylsilanes, can be added after the application of the SiO$_2$ coating and can be hydrolyzed in situ, with the silanes having at least one non-hydrolyzable substituent being firmly anchored, via further condensation reactions, to and on the silicon dioxide layer on the pigment surface. The filtercake which is obtained after cooling and suction removal of the solution can be dried under reduced pressure and supplied for the use as intended.

U.S. Pat. No. 2,885,366 A discloses a basic method for producing a product surface-stabilized by with metal oxides, it also being possible for this product to consist of SiO$_2$-coated metallic effect pigments.

A fundamental method for producing effect pigments coated with reactive orientation assistants—using a basic catalyst—is described in DE 198 20 112 A1.

Waterborne basecoat materials comprising SiO$_2$-coated aluminum effect pigments are disclosed in EP 1 332 714 A1.

WO 2004/026268 A2 as well discloses a method for producing a corrosion-stable metallic effect pigment for a cosmetic product, which involves providing the aluminum core with an SiO$_2$ coating by means of a sol-gel process using suitable catalysts. The catalysis itself is not described in any more detail in that patent application.

EP 1 756 234 B1 relates to a method for producing an aqueous coating composition which comprises at least one water-compatible, film-forming agent and aluminum effect pigments provided with at least one inorganic corrosion protection layer. These aluminum effect pigments have at least one SiO$_2$ layer produced by a sol-gel process. No details relating to the stabilization with respect to corrosion are evident from that patent.

The U.S. Pat. No. 7,419,538 B2 discloses a process for producing platelet-shaped aluminum effect pigments which are pretreated with phosphoric acid and/or boric acid and are subsequently provided with an SiO$_2$ layer by a sol-gel process in water. With this method, a basic catalyst is used in the course of the coating operation.

EP 1 619 222 A1 relates to a process for producing an aluminum effect pigment provided with a molybdenum coating and/or $SiO_2$ coating and intended for water-based inks, using organic bases, such as ethanolamine, for example, or organic or inorganic acids, such as sulfuric acid or oxalic acid, for example, as catalysts.

EP 1 953 195 A discloses a method for stabilizing aluminum effect pigments by applying a multilayer coating. In that case the pigment, pretreated with phosphorus compounds or molybdenum compounds, is encapsulated with silicon dioxide by an acidically or basically catalyzed sol-gel synthesis, and is subsequently clad in a separate step with an organic polymer matrix.

WO 03/095564 A1 relates to a process for producing goniochromatic luster pigments having a coating which displays interference colors, with a polar organic solvent being incorporated into the coating. To produce these goniochromatic luster pigments, the pigment particles, such as, for example, corrosion-stabilized aluminum effect pigments, are first coated with a dielectric layer of low refractive index, such as silicon dioxide, for example, and are subsequently provided with a reflective coating. Wet-chemical coating of the aluminum effect pigments with silicon dioxide takes place in the basic pH range.

Lastly, JP 2004124069 A discloses a process for producing silicon dioxide-coated aluminum effect pigments for water-based application systems, using basic catalysts.

The known processes for the $SiO_2$ coating of metallic effect pigments have the disadvantage, however, that they do not always—especially in the case of very fine metallic effect pigments—ensure sufficient corrosion stability, more particularly gassing stability, of the metallic effect pigments obtainable therewith. Moreover, there is usually a distinct loss of opacity as a result of the $SiO_2$ coating.

SUMMARY OF THE INVENTION

In some non-limiting embodiments, the present invention provides a silicon oxide-coated metallic effect pigment in the form of a powder, dry product or paste, wherein in and/or on a silicon oxide layer and/or in a solvent of the paste there is 0.01%-1% by weight of organic and/or inorganic acid and 0.01%-1% by weight of organic and/or inorganic base, where the % by weight figures are based on the total weight of the pigment.

Also provided is a method for coating metallic effect pigments with silicon oxide, in which at least one of alkoxysilane(s) and silicon halide(s) in organic solvent are reacted with water in the presence of metallic effect pigments, wherein the reaction comprises at least two steps, where (a) the reaction is carried out with addition of acid in a first step and with addition of base in a second step or where (b) the reaction is carried out with addition of base in a first step and with addition of acid in a second step.

In some non-limiting embodiments, the applied silicon oxide coating is subsequently subjected to organic-chemical modification.

BRIEF DESCRIPTION OF THE DRAWING

The foregoing summary, as well as the following detailed description, will be better understood when read in conjunction with the appended drawing. In the drawing:

FIG. 1 is a graph showing the hiding power (opacity) of the aluminum effect pigments coated in accordance with inventive examples 1 to 3 and comparative examples 4 to 6, and also in comparison to the uncoated starting pigment Stapa Metallux 3580 (comparative example 7).

DETAILED DESCRIPTION

It is an object of the invention to provide metallic effect pigments, more particularly aluminum effect pigments, which are stabilized with respect to corrosion and exhibit improved performance properties. The intention in particular is for the metallic effect pigments to be provided to exhibit enhanced opacity and/or gassing stability.

The object on which the invention is based is achieved through provision of a metallic effect pigment in the form of powder, dry product or paste, where in and/or on the silicon oxide layer and/or in the solvent of the paste there is 0.01%-1% by weight of organic and/or inorganic acid and 0.01%-1% by weight of organic and/or inorganic base, where the % by weight figures are based on the total weight of the pigment.

Preferred developments are specified in dependent claims 2 to 5.

It is a further object of the invention to provide a method for coating metallic effect pigments, more particularly aluminum effect pigments, featuring enhanced opacity and gassing stability.

The object on which the invention is based is further achieved by provision of a method for coating metallic effect pigments with silicon oxide, in which alkoxysilane(s) and/or silicon halide(s) in organic solvent are reacted with water in the presence of metallic effect pigments, where the reaction comprises at least two steps, where (a) the reaction is carried out with addition of acid in a first step and with addition of base in a second step, or where (b) the reaction is carried out with addition of base in a first step and with addition of acid in a second step.

The object of the invention is further achieved through the use of metallic effect pigment of claims 1 to 5 in cosmetics, plastics, and coating compositions, preferably inks, printing-inks, paints, and powder coating materials.

Lastly, the object of the invention is also achieved through provision of an article, where the article comprises metallic effect pigment of claims 1 to 5.

In the method of the invention, the alkoxysilane(s) and/or the silicon halide(s) are hydrolyzed in the organic solvent or solvent mixture by the water that is present and/or added. The hydrolysis results in the formation on the silicon atoms of OH groups, also referred to as silanol groups. The silanol groups condense with elimination of water to form an Si—O—Si network. This Si—O—Si network then precipitates in the form of a sol/gel onto the metallic effect pigments, as a result of which they become enveloped or encapsulated with silicon oxide, preferably $SiO_2$.

The inventors have surprisingly discovered that metallic effect pigments which have been coated with silicon oxide, preferably $SiO_2$, by an at least two-stage method exhibit enhanced performance properties. This two-stage method is based on various catalysts and comprises an acidically catalyzed step and a basically catalyzed step.

At present it is not yet clear what lies behind this surprising effect. Depending on the pH, there is a change in the ratio of the rate of hydrolysis of the alkoxy group(s) of the alkoxy silanes and/or of the halide(s) of the silicon halides to silanol group(s) to the rate of the condensation of the silanol groups with one another to form Si—O—Si bonds.

In one preferred variant of the invention, the hydrolysis of the alkoxy group(s) takes place primarily with addition of acid(s). In this method variant, the pH is preferably within a range from pH 3 to 7, preferably from pH 4 to 6.5. A pH range from pH 4.5 to pH 6 is also very suitable.

In accordance with one preferred development of this method variant, the condensation of the generated silanol groups to form Si—O—Si bonds takes place predominantly with addition of base. The pH in this case is preferably within a pH range from more than pH 7 to pH 11, more preferably from pH 7.5 to pH 10. A pH in the range from pH 8 to pH 9.5 has also proven very suitable.

In accordance with one variant of the invention it is also possible to apply a continuous pH gradient during coating. In this case the pH is preferably changed continuously from acidic to basic by continuous addition of the corresponding reagents.

In a further-preferred embodiment, between the step of hydrolysis with addition of acid and the step of condensation with addition of bases, there is a pH jump. The difference in pH between the first and second steps is preferably within a range from 0.3 to 4 pH units, more preferably from 0.5 to 3 pH units, and more preferably still from 0.7 to 2 pH units.

In this exceptionally preferred embodiment of the method of the invention, the reaction takes place with acidic catalysis in a first step and with basic catalysis in a second step. The reaction scheme (I) here is as follows:

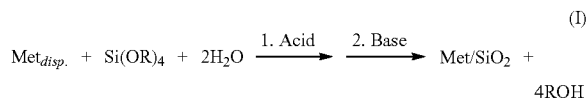

The acid and base, respectively, each act catalytically, by influencing the reaction rate of the hydrolysis to silanol groups and/or condensation of the silanol groups to form Si—O—Si bonds in a silicon oxide network, preferably a silicon dioxide network. Here, in the first step, the hydrolysis of the alkoxysilanes takes place to form silanols (Ia), and, in the second step, the condensation of the silanols (Ib) takes place kinetically, preferably.

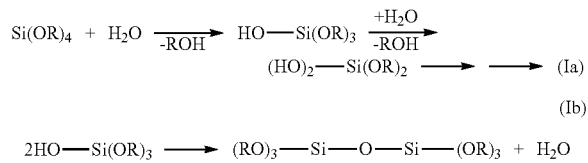

It is known of sol-gel processes that acidic catalysis first produces linear and/or cyclic and/or ladderlike siloxane oligomers which have only a low silanol group fraction. The reason lies in the decreasing rate of hydrolysis of the oligomeric alkoxysilanes relative to the rate of hydrolysis of the monomeric alkoxysilanes. In the case of basic catalysis, in contrast, three-dimensional siloxane oligomer structures are formed preferentially, with a high silanol content. In this case there is an increasing rate of hydrolysis of the oligomers relative to the rate of hydrolysis of the monomeric alkoxysilanes, and also a high condensation rate.

In the case of a rapid condensation of silanol groups to form Si—O—Si bonds, metallic effect pigments having a small particle diameter are disadvantageously deposited or precipitated, together with the rapidly forming silicon oxide, typically $SiO_2$, on the surface of metallic effect pigments having a larger particle diameter. The metallic effect pigments with the smaller particle diameter are therefore encapsulated in the silicon oxide envelope of the metallic effect pigments with the larger particle diameter.

This has twin disadvantages:

For good opacity (hiding power), i.e., the area of substrate surface hidden per unit weight of pigment, an essential factor is the fraction of metallic effect pigments having a small particle diameter, also referred to as fine fraction, in a metallic effect pigment preparation.

A metallic effect pigment is normally present in a particle size distribution. As the breadth of the particle size distribution goes up, there is an increase in the opacity of the metallic effect pigment. The fine fraction of a metallic effect pigment, preferably aluminum effect pigment, is characterized for example by the $D_{10}$ of the cumulative distribution of the size distribution curve. The size distribution curve is typically determined by means of laser granulometry.

As a result of the reduction in the fine fraction of a metallic effect pigment preparation by the precipitation thereof together with the nascent silicon oxide onto the metallic effect pigments with the larger particle diameter, the opacity of the silicon oxide-coated metallic effect pigment preparation is reduced.

The second disadvantage is that the metallic luster of the metallic effect pigment preparation coated with silicon oxide is reduced. Owing to the precipitation of the fine fraction onto the metallic effect pigments with the larger pigment diameter, incident light is scattered to an increased extent quite simply because of the increased edge fraction. This effect is particularly deleterious to the luster of the metallic effect pigments.

In the case of this first variant of the method of the invention, the precipitation of silicon oxide onto the metallic effect pigments is slow, presumably because of the slow generation of the silanol groups. Presumably, in light of the slower precipitation of the silicon oxide, the fine fraction of the metallic effect pigment preparation is not entrained, but is instead separately coated with silicon oxide, with, consequently, no adverse effect on the opacity and the metallic luster.

In the second step of the method, after the metallic effect pigments have been coated with a first layer of silicon oxide, preferably $SiO_2$, a second layer of silicon oxide, preferably $SiO_2$, is subsequently applied with addition of base.

Surprisingly, after the addition of base in the second step, there is no substantial agglomeration, and preferably no agglomeration, of metallic effect pigments with small particle diameter at or on metallic effect pigments with the larger particle diameter. It is presumed that this effect can be attributed to the coverage of the metallic effect pigment surface with the first silicon oxide coating.

It is surprising, furthermore, that in the method of the invention, which may also be referred to as a sol-gel process, metallic effect pigments are coated with the same amounts of silicon oxide, preferably $SiO_2$, as in a purely basic procedure used typically in the prior art, despite the fact that the reaction begins in an acidic or acidified reaction solution and ends, preferably by way of a pH gradient, in a less acidic, neutral or basic, range.

This is true in particular in light of the fact that from the prior art it is evident that the precipitation of silicon dioxide onto an aluminum effect pigment surface with catalysis with a base results in better layer formation and a better yield (e.g., EP 1 619 222 A1, EP 1 953 195 A1), which is why the prior art in principle uses a basic catalyst (A. Kiehl, K. Greiwe, Progr. in org. Coatings 37 (1999), 179-183).

In accordance with the invention it is possible, surprisingly, to operate in a pH range from pH 4 to 7, which was explicitly ruled out in the prior art, such as in EP 1 953 195 A1, for example, when carrying out an operation conducted exclusively in the acidic pH range.

Surprisingly, therefore, it has been found that the metallic effect pigments coated by the sol-gel method of the invention with silicon oxide, preferably $SiO_2$, have an opacity which is improved relative to that of metallic effect pigments coated with silicon oxide by the conventional sol-gel method.

In the case of the second method variant, in accordance with reaction scheme (II), the basic catalysis takes place in a first step and the acidic catalysis subsequently, in a second step:

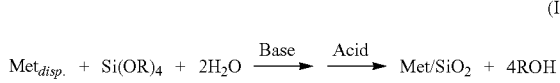

(II)

Surprisingly, this method route as well leads to enhanced opacity on the part of the metallic effect pigments of the invention.

In one preferred embodiment, following the addition of the basic catalyst, the acidic catalyst used in the second step is added rapidly. This means that, based on the point in time at which the basic catalyst is added, the period for addition is preferably from 15 min to 4 h, more preferably 20 min to 2.5 h, and more preferably still 30 min to 1.5 h. In one embodiment of the second method variant, the pH may be changed continuously from basic to acidic by addition of acid. In the case of another preferred embodiment of the second method variant, the addition of acid takes place with a pH jump. The difference in pH between the first and second steps is situated preferably within a range from 0.3 to 4 pH units, more preferably from 0.5 to 3 pH units, and more preferably still from 0.7 to 2 pH units.

For both method variants, the acids and/or bases used as catalysts are in principle the same.

As acids it is possible to use organic and/or inorganic acids. Organic acids are particularly preferred.

The organic acid(s) used as acidic catalyst in accordance with the invention comprises preferably 1 to 8 C atoms, more preferably 1 to 6 C atoms, and very preferably 1 to 4 C atoms.

The organic radical of these acids may comprise linear, cyclic or branched alkyl, alkenyl, aryl, and aralkyl radicals.

The acids may be monobasic, dibasic or tribasic acids, with monobasic or dibasic acids being particularly preferred.

Above 8 C atoms, the acid strength is generally too low and the steric shielding is too high to allow use as an effective catalyst.

In accordance with one preferred variant, the organic acid used as acidic catalyst is selected from the group consisting of formic acid, acetic acid, propionic acid, oxalic acid, malonic acid, maleic acid, succinic acid, anhydrides of the stated acids, and mixtures thereof. It is especially preferred to use formic acid, acetic acid or oxalic acid and also mixtures thereof.

In accordance with a further variant of the invention, the inorganic acid used as acidic catalyst in accordance with the invention is preferably selected from the group consisting of nitric acid, sulfuric acid, phosphoric acid, hydrochloric acid, boric acid, hydrofluoric acid, and mixtures thereof. In this case it is particularly preferred to use nitric acid and/or hydrofluoric acid.

The basic catalyst is preferably an organic base and more preferably an amine. The amines in question may be primary, secondary or tertiary.

In a further-preferred embodiment, the amine has 1 to 8, more preferably 1 to 6, and very preferably 1 to 5 C atoms. Amines having more than 8 C atoms often have an excessive steric bulk to allow them to be used as effective catalysts.

According to one preferred variant of the invention, the amine is selected from the group consisting of dimethylethanolamine (DMEA), monoethanolamine, diethanolamine, triethanolamine, ethylenediamine (EDA), tert-butylamine, monomethylamine, dimethylamine, trimethylamine, monoethylamine, diethylamine, triethylamine, pyridine, pyridine derivative, aniline, aniline derivative, choline, choline derivative, urea, urea derivative, hydrazine derivative, and mixtures thereof.

As basic aminic catalyst it is particularly preferred to use ethylenediamine, monoethylamine, diethylamine, monomethylamine, dimethylamine, trimethylamine, triethylamine or mixtures thereof.

Additionally preferred as basic catalyst is an aminosilane selected preferably from the group consisting of 3-aminopropyltriethoxysilane (AMEO), 3-aminopropyltrimethoxysilane (AMMO), N-2-aminoethyl-3-aminopropyltriethoxysilane (DAMEO), N-2-aminoethyl-3-aminopropyltrimethoxysilane (DAMO), N-2-aminoethyl-3-aminomethylpropyltriethoxysilane, triamino-functional trimethoxysilane (Silquest A-1130), bis(gamma-trimethoxysilylpropyl)amine (Silquest A-1170), N-ethylgamma-aminoisobutyltrimethoxysilane (Silquest A-Link 15), N-phenyl-gamma-aminopropyltrimethoxysilane (Silquest Y-9669), 4-amino-3,3-dimethylbutyltrimethoxysilane (Silquest Y-11637), N-cyclohexylaminomethylmethyldiethoxysilane (GENIOSIL XL 924), (N-cyclohexylaminomethyl)triethoxysilane (GENIOSIL XL 926), (N-phenylaminomethyl)trimethoxysilane (GENIOSIL XL 973) and mixtures thereof.

As basic catalysts it is particularly preferred to use 3-aminopropyltriethoxysilane (AMEO), 3-aminopropyltrimethoxysilane (AMMO), N-2-aminoethyl-3-aminopropyltriethoxysilane (DAMEO), N-2-aminoethyl-3-aminopropyltriemthoxysilane (DAMO) or mixtures thereof.

As basic catalyst it is of course also possible to use a mixture of at least one amine and at least one amino silane.

The inorganic base is preferably selected from the group consisting of ammonia, hydrazine, sodium hydroxide, potassium hydroxide, ammonium hydroxide, ammonium carbonate, ammonium hydrogencarbonate, sodium carbonate, sodium hydrogencarbonate, potassium carbonate, potassium hydrogencarbonate, and mixtures thereof.

It is particularly preferred in this context to use ammonia and/or hydrazine, and especially preferred to use ammonia.

The silicon oxide is preferably $SiO_2$. $SiO_2$ produced by sol-gel processes is known to be amorphous. It has a significant fraction of bound water. This water may be intercalated into the $SiO_2$. Furthermore, the silicon oxide contains a fraction of unhydrolyzed alkoxy groups.

For producing silicon oxide, preferably $SiO_2$, it is preferred to use alkoxysilanes.

The alkoxysilane used in accordance with the invention preferably comprises di-, tri- and/or tetraalkoxysilanes. Tetraalkoxysilane is especially preferred. When tetraalkoxysilane is used, the hydrolysis results in formation of four silanol groups, which, with condensation, produce a high degree of crosslinking, i.e., a silicon oxide coating, preferably $SiO_2$ coating, having a good barrier effect. When di- or trialkoxysilanes are used, hydrolysis, accordingly, produces two or three silanol groups, which are able to condense to form an Si—O—Si network. The use of di- or trialkoxysilanes permits the introduction of organic groups, as for example of alkyl groups, or polymers into the silicon oxide coating, to form an inorganic-organic hybrid layer. The di- or trialkoxysilanes can also be dubbed organosiloxanes.

An alkoxysilane in accordance with the invention is any monomeric or polymeric silicon compound having at least one alkoxy group. Tetraalkoxysilane used advantageously comprises tetramethoxysilane, tetraethoxysilane, tetraisopropoxysilane, and condensates thereof, or mixtures of these.

It is particularly advantageous to use, as tetraalkoxysilane, tetraethoxysilane and/or oligomers of tetraethoxysilane.

When using alkoxysilane(s), preferably tetraalkoxysilane(s), the great advantage is that no salts are produced. This is advantageous both environmentally and in regard of possible agglomeration processes during the sol-gel reaction, since salts disrupt the electrostatic stabilization of the pigment particles.

Another advantage is that, in contrast to the use of silicon halides, there is no release of halides such as chloride ions, for example. Halide ions, as is known, may promote the corrosion of metals.

The silicon halide used in accordance with the invention preferably comprises di-, tri- and/or tetra silicon halides. Silicon tetrahalide is especially preferred. The above remarks relating to di-, triand/or tetraalkoxysilanes apply correspondingly.

A silicon halide in accordance with the invention is any monomeric or polymeric silicon compound having at least one halide group.

Silicon halides used are preferably tetrasilicon halides. Tetrasilicon halides used are preferably tetrasilicon fluoride, tetrasilicon chloride, tetrasilicon bromide, tetrasilicon iodide or mixtures thereof, or mixed halides of these compounds.

The reaction preferably takes place in a one-pot operation. In this case the metallic effect pigments are dispersed in the organic solvent with stirring, the reaction mixture is brought preferably to elevated temperature, and water is added. Subsequently, the first catalyst, i.e., acid or base, depending on method variant, is added, and, after a first reaction time, the second catalyst, i.e., base or acid, depending on method variant, is added. The mixture is left under these conditions for a second reaction time. It is then possible, optionally, for surface modifiers to be added. The mixture is cooled preferably to room temperature and the coated metallic effect pigments are largely separated from the solvent, to form a metallic effect pigment filtercake.

A substantial disadvantage of the conventionally employed basic sol-gel coating of a metallic effect pigment is the lack of or inadequacy of balance in the performance properties of the resultant coated metallic effect pigments, especially with regard to hiding power and corrosion stability, in an application medium, such as in a pigmented waterborne paint, for example.

As is known, inadequate corrosion stability on the part of a metallic effect pigment, more particularly an aluminum effect pigment, in an aqueous application medium leads to reaction with the water, with hydrogen being evolved and the metallic effect pigment breaking up. Even slight corrosion impairs the optical properties, more particularly the specular gloss.

The opacity or hiding power of a pigmented medium means the capacity of the pigmented medium to hide the color or color differences in a substrate (DIN 55987).

For the optical appearance of a metallic effect pigment, more particularly of an aluminum effect pigment, one important optical assessment criterion for pigmented applications is the particle size of the pigment and its distribution, known as the particle size distribution.

The hiding power (or opacity) which characterizes the optical appearance of a metallic effect pigment preparation, more particularly an aluminum effect pigment preparation, increases as the breadth of the particle size distribution goes up, since in that case the amount of the fine fraction is increasingly greater. Generally speaking, the hiding power or opacity increases as the fineness of the metallic effect pigment in the metallic effect pigment preparation goes up.

The metallic effect pigments preferably have a particle size distribution with a $D_{50}$ of 2 to 75 µm, more preferably of 2 to 30 µm, and particularly preferably of 2.5 to 20 µm, and very preferably of 2.5 to 12 µm. The finer the metallic effect pigments, the greater the loss of opacity in comparison to the uncoated starting material, in the case of the conventional products. Surprisingly, the metallic effect pigments of the invention exhibit an improvement in the opacity particularly in the case of these relatively fine pigments.

The metallic effect pigment used as starting pigment in the method of the invention is preferably dispersed into a solvent mixture which comprises alkoxysilane, preferably tetraalkoxysilane, this mixture being composed of, or including, organic solvent and optionally water. The acidic catalyst, preferably organic or inorganic acid(s), is added preferably after the dispersing of the metallic effect pigment in the organic solvent and optional heating of the dispersion to reaction temperature. The water required for the hydrolysis may already be present in the organic solvent or may be added at a later point in time.

Then organic or inorganic base(s) is/are introduced as basic catalyst into the reaction mixture comprising metallic effect pigments, alkoxysilanes, preferably tetraalkoxysilanes, water, and acid(s), in order to start the second stage of the method of the invention.

Organic solvents used are preferably alcohols, glycols, esters, ketones, and mixtures of these solvents. Particularly preferred is the use of alcohols or glycols or mixtures thereof, and especially preferred is the use of alcohols.

As the alcohol it is advantageous to use methanol, ethanol, isopropanol, n-propanol, tert-butanol, nbutanol, isobutyl alcohol, pentanol, hexanol or mixtures thereof.

Particular preference is given to using ethanol and/or isopropanol.

As glycol, it is advantageous to use butylglycol, propylglycol, ethylene glycol or mixtures thereof.

The reaction mixture present is reacted preferably at a temperature within a range from 20° C. up to the boiling point of the respective solvent or solvent mixture. With particular preference the reaction temperature is within a range from 50° C. up to a temperature which is preferably 5° C. below the boiling point of the respective solvent or solvent mixture. A preferred reaction temperature range is the temperature range extending from 75° C. to 82° C.

The reaction time, for the first and/or second stage of the method of the invention, is situated preferably, in each case, within a range of 2 to 20 h, more preferably 3 to 8 hours.

The metallic effect pigment, preferably aluminum effect pigment, coated with silicon oxide, preferably $SiO_2$, using the method of the invention may optionally be provided with a surface modification adapted to the particular end application. This surface modification, for example, may comprise silane or may consist of silane.

Examples of surface-modified aluminum effect pigments are described comprehensively in DE 198 20 112 A1, for example, the content of which is hereby incorporated by reference.

The pigments produced in accordance with the invention are $SiO_2$-coated metallic effect pigments, also referred to as metal flakes, preferably selected from the group consisting of aluminum, iron, zinc, tin, silver, gold, stainless steel, copper, brass (gold bronze), titanium, and alloys and mixtures of these metals. Metallic effect pigments are platelet-shaped metal pigments which can be obtained by milling atomized metal powder or by means of PVD techniques (PVD: physical vapor deposition). The metallic effect pigments have an average particle diameter which is preferably in the range from 1 µm to 200 µm, more preferably from 5 µm to 150 µm.

The metallic effect pigments are preferably aluminum, iron, copper or brass (gold bronze), and more preferably aluminum.

The aluminum effect pigments may be of the "conflake" type or of the "silver dollar" type.

Particularly advantageous is the use of aluminum effect pigments in accordance with the disclosure content of DE 103 157 15 A1 and DE 10 2006 062271, the content of which is hereby incorporated by reference. Aluminum effect pigments such as these, also identified as "Platindollar®" or "Silvershine®® S", are produced by wet grinding and in terms of their pigment properties such as average thickness and thickness distribution are virtually comparable with PVD aluminum effect pigments. In contrast to PVD aluminum effect pigments, these "Platindollar" or "Silvershine" aluminum effect pigments, obtained by wet grinding, do not have an absolutely planar surface, as is the case with PVD aluminum effect pigments. PVD aluminum effect pigments, furthermore, have relatively straight fracture edges, whereas the aluminum effect pigments obtained by wet grinding have an irregularly shaped marginal region which may also be referred to as a frayed marginal region.

With particular advantage, metallic effect pigments, preferably aluminum effect pigments, having an average thickness $h_{50}$, as determined via thickness counting by scanning electron microscopy, of 15 to below 100 nm and a relative breadth of the thickness distribution $\Delta h$, as determined via thickness counting by scanning electron microscopy, which is calculated on the basis of the corresponding cumulative frequency curve of the relative frequencies, according to the formula $\Delta=100\times(h_{90}-h_{10})/h_{50}$, of 30% to 140% can be used, as disclosed in DE 10315715 A1 and DE 102006062271. The cumulative frequency curve is also referred to as the cumulative undersize curve.

A further-preferred embodiment relates to PVD metallic effect pigments, preferably PVD aluminum effect pigments, which can be coated with silicon oxide by the method of the invention to provide metallic effect pigments of the invention.

The metallic effect pigment, preferably aluminum effect pigment, coated with silicon oxide, preferably $SiO_2$, and optionally surface-modified is separated from the reaction mixture and can then be passed on to its intended use. For example, the metallic effect pigment of the invention can be processed further as a powder or paste and can then be introduced into inks, printing-inks, paints, plastics, cosmetics, etc.

This invention additionally provides, furthermore, a metallic effect pigment coated with silicon oxide which is in the form of a powder, dry product or paste, and is distinguished by the fact that in and/or on the silicon oxide layer and/or in the solvent of the paste there is
0.01%-1% by weight of organic and/or inorganic acid and
0.01%-1% by weight of organic and/or inorganic base, where the % by weight figures are based on the total weight of the pigment.

The dry product of the invention may take the form, for example, of granules, pellets, sausages, tablets, briquettes, etc. The dry product may take the form of a low-dust or dust-free metallic effect pigment preparation. The residual moisture content here may be in a range from 0.5% up to 29% by weight, preferably up to 1% to 24% by weight, more preferably from 3% up to 14% by weight, more preferably still from 4% up to 9% by weight, with these figures being based in each case on the total weight of the dry product. The dry product preferably further comprises binder, generally organic polymer(s) and/or resin(s), and also, optionally, additive(s). The amount of binder in the dry product is preferably in a range from 0.5% to 20% by weight and more preferably from 1% to 5% by weight, based in each case on the total weight of the dry product.

The acids and/or bases here may be at least partly in ionic form, as for example in the form of a salt. The bases may also be at least partly in the form of a salt with the acidic silanol groups (Si—OH).

These features are an inevitable consequence of the method of the invention. With particular preference, the concentrations of the organic and/or inorganic acid and of the organic and/or inorganic base independently of one another are 0.015%-0.5% by weight and very preferably 0.015%-0.2% by weight, based on the total weight of the pigment. In view of the two-stage method of the invention, not only acid and/or acid anions but also bases are located in and/or on the silicon oxide layer. These components are catalyst residues which are adsorbed and/or enclosed in the silicon oxide layer.

The acids and bases are preferably located predominantly in the $SiO_2$ layer. If the metallic effect pigment of the invention is in the form of a paste, the acids and/or base may also be largely in the solvent of this paste. Thus the solvent of the paste may also leach the acids and/or bases which to start with are predominantly in the $SiO_2$ layer from that layer. This may be the case in particular after a certain storage time of the metallic effect pigment of the invention, with the subsequent surface adsorption of the acid and/or base onto the $SiO_2$ layer being possible.

A paste in the context of this invention is a mixture comprising the metallic effect pigment coated in accordance with the invention and a solvent, with the amount of metallic effect pigment being preferably 5% to 80% by weight and the amount of metallic effect pigment and the solvent being preferably at least 95% by weight, based on the paste.

Depending on the nature, and more particularly on the specific surface area and also the surface properties, of the silicon oxide-coated metallic effect pigment, and possibly on the nature of the solvent, the preparation may take the form of a dry preparation or a paste.

The amount of metallic effect pigment in the paste is heavily dependent on its specific surface area. If the desire is to bring very thin metallic effect pigments having average thicknesses below 100 nm, such as PVD pigments, for example, into a pasty form, then a very high solvent fraction is necessary for this purpose. Accordingly, the amount of such pigments is preferably 5% to 30% by weight and more preferably 10% to 20% by weight, based on the total weight of the paste. Pastes such as these should always be viewed as a precursor product for the subsequent application of the metallic effect pigment.

For thicker metallic effect pigments having average thicknesses>100 nm, metallic pigment contents of above 20% to 80% by weight, preferably 30% to 75% by weight, and more preferably 50% to 70% by weight, based in each case on the total weight of the paste, are generally sufficient.

The paste may further comprise additional constituents such as additives, for example. The fraction of further components, however, is low, since this is not an end application (formulation). The amount of metallic effect pigment and the solvent in the paste is therefore preferably at least 97% by weight and more preferably at least 98% by weight, based in each case on the paste.

The solvents present in the paste are preferably solvents familiar in the paints and printing-ink industry. Since the principal end use of the metallic effect pigments of the invention is as water-based paints or printing-inks, particularly preferred pastes are those in which the solvent comprises or consists of water. The water fraction of the paste of the invention is preferably 20% to 100% by weight, more preferably 30% to 90% by weight, and very preferably 40% to 80% by weight, based on the weight of the solvent in the paste. Pastes such as these are particularly preferred for environmental reasons, on account of their low VOC fraction.

The residues present in the silicon oxide layer amount in general to not more than 1% by weight in each case. This can be attributed to the fact that the reaction, as described above, takes place in a mixture of organic solvent and water. Generally speaking, the major fraction of the catalysts used as acid and/or base is dissolved in this solvent mixture. The fraction of catalyst included in the pigment therefore corresponds only to a small fraction of the catalyst employed overall.

The organic acid and/or anions thereof does not comprehend long-chain fatty acids, i.e., saturated or unsaturated fatty acids having 12 to 30 C atoms or having 14 to 22 C atoms. Such fatty acids are used as lubricants during the grinding of metallic pigments. Consequently, as a result of the production process, any metallic effect pigment produced by grinding will contain these fatty acids. During the $SiO_2$ coating operation, the fatty acids bound to the metal surface are largely detached. In certain fractions, however, they may be incorporated into the $SiO_2$ layer or may be adsorbed on the pigment surface after the end of the coating procedure.

Because of their low acid strength and because of the high steric shielding, however, these long-chain fatty acids are not used as catalysts in sol-gel methods for producing $SiO_2$ layers.

Accordingly, in accordance with the invention, the acids and bases which are present in and/or on the silicon oxide layer in the stated proportions are understood to include only those which are used in sol-gel processes as a catalyst for the deposition of silicon oxide.

Preferred acids or base are those compounds already stated above.

In the case of aminosilanes as basic catalyst, it should be noted that these are commonly also used as surface modifiers, in order to allow effective attachment of the metallic effect pigment to the binder. For that purpose, however, it is common to use amounts of at least 1% by weight, based on the metallic effect pigment.

The analytical detection of the bases and/or acids is made preferably by means of gas chromatography and mass spectroscopy. In this case, in a preferred way, the coated metallic effect pigment is taken up in a suitable organic solvent, treated in an ultrasound bath at room temperature or slightly elevated temperature for at least 15 minutes, and admixed with—for example—hexadecane as internal standard. The solid is removed by centrifugation and the supernatant solution is used as the injection solution for the gas chromatograph. The supernatant solution may also, optionally, be concentrated in an appropriate way, if the concentration of the acid or base to be detected is otherwise too low.

Where the acids and/or bases to be detected are not known, then qualitative detection takes place preferably by means of GC/MS. In this case it is preferred to use a medium-polarity column. These columns, named DB5, are packed typically with 5% diphenal and 95% dimethylpolysiloxane. Where the substances to be detected are known, then their quantitative determination can take place by means of gas chromatography. In this case it is preferred to use an apolar column. Calibration takes place in a customary way known to the skilled person. These columns, named DB1, are typically packed with 100% dimethylpolysiloxane. A detection system suitable is a flame ionization detector (FID). The exact parameters for setting the gas chromatograph (e.g., column length and width, column pressure, etc) are known to the skilled person.

The gas chromatograph used is preferably a GC/FID Autosystem XL (from Perkin Elmer).

The acids and bases may also be determined by means of other mass-spectrometric techniques, such as TOF-SIMS, for example. In this case, continuous sputter removal of the sample may be necessary, in order to allow detection of the residual quantities of catalyst present in the $SiO_2$ layer as well. The method can be applied preferably where aminosilanes are used as basic catalyst, since these aminosilanes are naturally bonded covalently to the $SiO_2$ layer and do not have to be leached from it by extraction.

The metallic effect pigments coated with silicon oxide in accordance with the invention find use in cosmetics, plastics, and coating compositions, preferably inks, printing-inks, paints or powder coating materials. Particularly preferred in this context are waterborne paints, aqueous printing-inks or cosmetics.

The metallic effect pigments coated with silicon oxide in accordance with the invention are incorporated into their respective application media in a customary way. An article may then be coated with these application media thus pigmented. Said article may be, for example, a vehicle body, an architectural facing element, etc.

In the case of plastics, the metallic pigment of the invention may also be incorporated for coloring into the application medium in the mass. The articles have and/or comprise the metallic effect pigments coated with silicon oxide in accordance with the invention.

The examples below and FIG. 1 illustrate the invention in more detail, though without restricting the invention:

Figures

FIG. 1 shows the hiding power (opacity) of the aluminum effect pigments coated in accordance with inventive examples 1 to 3 and comparative examples 4 to 6, and also in comparison to the uncoated starting pigment Stapa Metallux 3580 (comparative example 7).

INVENTIVE EXAMPLE 1

150 g of a commercial aluminum effect pigment paste of the series STAPA METALLUX 3580 from Eckart GmbH, Hartenstein, Germany, having a size distribution of $d_{10}$=7.5 µm, $d_{50}$=12.1 µm, and $d_{90}$=18.7 µm and a solids content of 60% by weight, based on the total weight of the paste, were dispersed at room temperature in 400 ml of ethanol. After 30 minutes, 30 g of tetraethoxysilane and 2.0 g of oxalic acid in 54 g of water were added continuously over the course of 3 hours, with heating of the mixture to 78° C. and further conditioning at that temperature. After a stirring time of a further 2 hours without further addition, the batch was stirred for a further 3 hours, and each hour a solution of 1.0 g of ethylenediamine (EDA) in 13 g of isopropanol was added. For organic-chemical aftercoating after the end of the sol-gel reaction, 1.2 g of Dynasylan AMMO, available from Degussa AG, Rheinfelden, Germany, were added, and the batch was stirred for 1 hour. The reaction mixture was subsequently cooled to room temperature and filtered with suction through a Büchner funnel.

Quantitative Determination of Residues of Carboxylic Acid and/or Amine:

Carboxylic acid is determined by means of gas chromatography with an internal standard. For this purpose, a sample of the coated metallic effect pigment paste was taken up with a defined amount of acetone in the case of carboxylic acid determination and taken up in a defined amount of ethanol in the case of the amine determination, then treated in an ultrasound bath for minutes, and admixed with hexadecane as internal standard. The solid was removed by centrifugation and the supernatant solution was used as the injection solution for the gas chromatograph (GC/FID Autosystem XL (Perkin Elmer)). The carboxylic acid content was analyzed with the following outline parameters:

Column: 30 m OV 101 0.53 mm
Temperature program: 45° C. 1 min isothermal 5° C./min 180° C.
Injection board: 250° C.
Detector: 320° C.

Quantitative Determination of EDA:

The sample was prepared in the same way as indicated above. The gas chromatograph (GC/FID Autosystem XL (Perkin Elmer)) was equipped with the following outline parameters:

Column: 30 m OV 101 0.53 mm
Temperature program: 75° C. 10° C./min 200° C.
Injection board: 250° C.
Detector: 320° C.

0.02% by weight each of oxalic acid and EDA was detected, based on the weight of the coated aluminum pigment.

INVENTIVE EXAMPLE 2

150 g of a commercial aluminum pigment paste of the series STAPA METALLUX 3580 from Eckart GmbH, Hartenstein, Germany, having a size distribution of $d_{10}=7.5$ μm, $d_{50}=12.1$ μm, and $d_{90}=18.7$ μm and a solids content of 60% by weight, based on the total weight of the paste, were dispersed at room temperature in 400 ml of ethanol. After 30 minutes, 30 g of tetraethoxysilane and 1.0 g of acetic acid in 30 g of water were added and the mixture was heated to 78° C. and conditioned further at that temperature. After a stirring time of a further 2 h, a further mixture of 1.0 g of acetic acid in 24 g of water was added. After a further stirring time of 2 h, the batch was stirred for a further 3 h, and each hour a solution of 1.0 g of ethylenediamine in 13 g of isopropanol was added. For organic-chemical aftercoating after the end of the sol-gel reaction, 1.2 g of Dynasylan AMMO, available from Degussa AG, Rheinfelden, Germany, were added, and the batch was stirred for 1 hour. The reaction mixture was subsequently cooled to room temperature and filtered with suction through a Büchner funnel.

The amount of residues of acetic acid and EDA in the pigment was determined by the method described above. 0.02% by weight each of acetic acid and EDA was detected, based on the weight of the coated aluminum pigment.

INVENTIVE EXAMPLE 3

150 g of a commercial aluminum pigment paste of the series STAPA METALLUX 3580 from Eckart GmbH, Hartenstein, Germany, having a size distribution of $d_{10}=7.5$ μm, $d_{50}=12.1$ μm, and $d_{90}=18.7$ μm and a solids content of 60% by weight, based on the total weight of the paste, were dispersed at room temperature in 400 ml of ethanol. After 30 minutes, 30 g of tetraethoxysilane and a solution of 1.0 g of ethylenediamine in 13 g of isopropanol were added and the mixture was heated to 78° C. and conditioned at that temperature. The mixture was stirred initially for 2 h, after which a solution of 1.0 g of ethylenediamine in 13 g of isopropanol was added to the mixture. After 1 h, a solution of 2.0 g of oxalic acid in 54 g of water was added continuously to the mixture over a period of 30 min. For organic-chemical aftercoating after the end of the sol-gel reaction, 1.2 g of Dynasylan AMMO, available from Degussa AG, Rheinfelden, Germany, were added. The pigment mixture obtained was cooled to room temperature and filtered with suction through a Büchner funnel.

The amount of residues of oxalic acid and EDA in the pigment was determined by the method described above. 0.02% by weight each of oxalate and EDA was detected, based on the weight of the coated aluminum pigment.

COMPARATIVE EXAMPLE 4

150 g of the STAPA METALLUX 3580 aluminum effect pigment paste used in inventive examples 1 to 3 were dispersed in 300 ml of isopropanol at room temperature. After 30 minutes, 30 g of tetraethoxysilane were added and the mixture was heated to 78° C. and conditioned at that temperature. Then a solution of 1.0 g of ethylenediamine in 27 g of water was added and the reaction mixture was stirred for 1 hour. Subsequently a solution of 1.0 g of ethylenediamine with 18.6 g of isopropanol was added to the reaction mixture, which was stirred for an hour. Finally, again, a solution of 1.0 g of ethylenediamine with 18.6 g of isopropanol was introduced into the reaction mixture and the reaction mixture was then stirred at 78° C. for 4 hours. After the end of the sol-gel reaction, organic-chemical aftercoating was carried out by adding 1.2 g of Dynasylan AMMO, available from Degussa AG, Rheinfelden, Germany. The metallic effect pigment mixture obtained was cooled to room temperature and filtered with suction through a Büchner funnel.

The starting material used is an aluminum effect pigment having a relatively large fine fraction, which is very difficult to coat in a gassing-stable way with the $SiO_2$ coating techniques known conventionally.

The amount of residues of carboxylic acid and EDA in the pigment was determined by the method described above. 0.02% by weight of EDA was detected, based on the weight of the coated aluminum pigment. The amount of carboxylic acids was below the detection limit (approximately 0.01% by weight).

COMPARATIVE EXAMPLE 5

150 g of the STAPA METALLUX 3580 aluminum effect pigment paste used in inventive examples 1 to 3 and comparative example 4 were dispersed in 300 ml of isopropanol at room temperature. After 30 minutes, 30 g of tetraethoxysilane and 1.8 g of glacial acetic acid in 28 g of water were added and the mixture was heated to 78° C. and conditioned at that temperature. The suspension was subsequently stirred for four hours. After the end of the sol-gel reaction, organic-chemical aftercoating was carried out by adding 1.4 g of Dynasylan AMMO, available from Degussa AG, Rheinfelden, Germany. The pigment mixture obtained was cooled to room temperature and filtered with suction through a Büchner funnel.

The amount of residues of acetic acid and EDA in the pigment was determined by the method described above. 0.02% by weight of acetic acid was detected, based on the weight of the coated aluminum pigment. The amount of EDA was below the detection limit (approximately 0.01% by weight).

COMPARATIVE EXAMPLE 6

Here, the procedure of comparative example 5 was repeated, but initially adding only 1.0 g of glacial acetic acid in 15 ml of water and then heating the mixture to 78° C. and conditioning it at that temperature. After 45 min an additional 1.0 g of glacial acetic acid in 15 ml of water was added.

Table 1 reports the performance properties in terms of gassing stability and opacity (hiding power) of aluminum effect pigments (fineness $D_{50}$ 18-20 μm) coated with $SiO_2$ by the inventive sol-gel method (inventive examples 1 to 3) and by the conventional sol-gel method (comparative examples 4 to 6), in an aqueous paint system.

Gassing Test:

All of the coated metallic effect pigments were subjected to a gassing test. For the gassing test, 8.6 g of coated Al pigment in the form of a paste were incorporated into 315 g of colorless waterborne mixing varnish (ZW42-1100, BASF Würzburg) and brought to a pH of 8.2 using dimethanolethanolamine. 300 g of this paint were introduced into a gas wash bottle, which was closed with a double-chamber gas bubble counter. The volume of gas produced was read off, on the basis of the water volume displaced, in the lower chamber of the gas bubble counter. The gas wash bottle was conditioned at 40° C. in a water bath and the test was carried out over a maximum of 30 days. The test is passed if no more than 10.5 ml of hydrogen has been evolved after 30 days.

The test results are set out in table 1.

Opacity:

In order to evaluate the hiding power (opacity) of the aluminum effect pigments of the inventive and comparative examples, knife drawdowns thereof (pigmentation 1% to 5% by weight in Erco Bronzemischlack RE 2615 Farblos [colorless bronze mixing varnish], wet film thickness: 50 μm) were produced on a commercial black/white opacity chart (type 24/5, 250 $cm^3$, Erichsen GmbH & Co KG, HemerSundwig), and then subjected to colorimetry using a commercial measuring instrument from X-Rite at a viewing angle of 110° and an incident light angle of 45°. The measure of the opacity is the ratio of the lightness values at this measurement angle from the black side to the white side of the opacity chart. This parameter is plotted graphically as a function of the amount of pigment used, in FIG. 1, for the various samples. Here, additionally, the uncoated aluminum effect pigment was included as comparative example 7. The closer this ratio of the measured lightnesses comes to a value of 1, the better the opacity. As the numerical measure, the concentration was taken at which the curves in FIG. 1 intersect the lightness ratio value of 0.8 (opacity metric $c_{0.8}$). These values are likewise listed in table. 1.

Furthermore, laser granulometry was used for conventional determination of the size distribution of the aluminum effect pigments of the inventive and comparative examples. This was done using a Cilas 1064 instrument (Cilas, France). Tab. 1 shows the customary characteristic values of $d_{10}$ (fine fraction), $d_{50}$ (average), and $d_{90}$ (coarse fraction) of the corresponding cumulative undersize curve. These values represent volume-averaged values of equivalent spheres.

The particle sizes were additionally measured using an Accusizer from Particle Sizing Systems, Santa Barbara, Calif., USA). Here, a number-averaged evaluation is obtained, which emphasizes the fine fraction in a pigment distribution more clearly than with the volume averaging, which of course overevaluates larger particles. From the measurements it is possible to calculate the number of total particles measured per g. This parameter is likewise set out in table 1.

The procedure for determining these data was as follows:

For measurement in the Accusizer 780 APS, a sample quantity was dispersed in about 100 g of filtered isopropanol. The sample quantity here was selected such that the particle concentration was approximately 2000 particles/1 ml. When a homogeneous suspension had formed, the solution was dispersed in an ultrasound bath for 2 minutes, and immediately thereafter was subjected to measurement in the Accusizer 780 APS, with the following settings:

Diluent flow rate: 60 ml/min
Data collection time: 60 s
Syringe pump 3-way port
Flow pump normal speed factor 1030

The number of particles per gram of sample was calculated by

Number of particles (#/g of sample) =

$$\frac{\text{Concentration (\#/ml)} \times \text{Initial mass of isopropanol (g)}}{\text{Density of isopropanol (g/ml)} \times \text{Initial mass of sample (g)}}$$

TABLE 1

| Sample | $D_{10}/D_{50}/D_{90}$ in μm Cilas 1064 | Number of particles/g Accusizer | Amount of $SiO_2$/(%) based on aluminum | Gassing test after 30 d/ml | Opacity metric $c_{0.8}$ in % by weight |
|---|---|---|---|---|---|
| Inv. Ex. 1 | 8.9/14.0/20.4 | $6.9 \times 10^9$ | 7.6 | 8 | 4.0 |
| Inv. Ex. 2 | 8.4/13.5/20.1 | $7.4 \times 10^9$ | 7.6 | 6 | 4.0 |
| Inv. Ex. 3 | 10.8/17.5/26.3 | $4.0 \times 10^9$ | 9.6 | 9 | 4.5 |
| Comp. Ex. 4 | 9.9/15.2/21.7 | $3.7 \times 10^9$ | 8.1 | >10.5 ml after 10-12 d | 4.6 |
| Comp. Ex. 5 | 8.7/14.5/22.2 | $4.9 \times 10^9$ | 6.6 | >10.5 ml after 25 d | 4.3 |
| Comp. Ex. 6 | 8.0/13.0/19.4 | $5.2 \times 10^9$ | 6.8 | >10.5 ml after 28 d | 4.8 |

From table I it is clearly apparent that the aluminum effect pigments produced by the sol-gel method of the invention (inventive examples 1 to 3) have a substantially higher hiding power, with very good gassing stability, than the aluminum effect pigments produced by the conventional sol-gel method (comparative examples 4 to 6). The opacity of the aluminum effect pigments in comparative example 5 (acidic catalysis) was similar to that of the inventive aluminum effect pigment of inventive example 3. In this case, however, there was no gassing stability. This is possibly due—as also for the pigments of comparative example 6—to the relatively low $SiO_2$ content of the pigment, which suggests a relatively poor conversion rate in the sol-gel reaction. The aluminum effect pigments of (inventive) examples 1 and 2 had the best opacity and the best gassing stability.

This shows clearly that the object of the invention is best achieved by catalyzing the sol-gel operation for silicon oxide coating first in acidic medium and then in basic medium.

The number of particles per g as determined by means of the Accusizer measurements correlates very well with the opacity metric $c_{0.8}$. The greater the number of particles present, the greater the opacity. With these samples there is evidently an increased fine fraction present.

This is reflected only incompletely in the $d_{10}$ values of the size distribution by means of Cilas 1064. Evidently this method is less suitable for detecting such differences, owing to the inherent disregarding of the fine fraction.

Although it has not been precisely clarified why the coated aluminum effect pigments produced by the method of the invention exhibit improved opacity and at the same time very good gassing stability, it is supposed that, in the case of the inventive procedure, there is initially a slow growth of a compact $SiO_2$ layer, in view of the slow hydrolysis of the alkoxysilanes and/or of the silicon halides, having the effect, firstly, of forming a very gassing-stable silicon oxide coating and, secondly, of the fine fraction of the metallic effect pigment preparation no longer being precipitated onto the metallic effect pigments with the larger pigment diameter (particle diameter). The subsequent addition of the base(s) subjects the reaction to a controlled acceleration, with the opacity, surprisingly, being retained; in other words, the fine fraction of the metallic effect pigment preparation that has already been provided with a silicon oxide coating is no longer bound to the metallic effect pigments with the larger particle diameter.

The good balance between opacity (hiding power) and gassing stability of the silicon oxide-coated aluminum effect pigments produced by the sol-gel method of the invention can probably be attributed to the fact that, in spite of $SiO_2$ coating, a surprisingly large fine fraction remains separately obtained, and hence the opacity is significantly improved.

In a summarizing evaluation of the experimental results, it may be stated that the aluminum effect pigments coated with $SiO_2$ by the sol-gel method of the invention have significantly better performance properties in terms of opacity (hiding power) with good gassing stability, compared with aluminum effect pigments coated with $SiO_2$ by the conventional sol-gel method.

The aluminum effect pigments produced in accordance with the invention can therefore be used with particular advantage not only in aqueous paint systems, aqueous inks and aqueous printing-inks, but also in cosmetics, which are typically likewise water-containing.

The invention claimed is:

1. A method for coating metallic effect pigments with silicon oxide, said method comprising:
   reacting a reaction mixture comprising at least one of alkoxysilane(s) and silicon halide(s) with water in the presence of metallic effect pigments(s) and organic solvent(s),
   wherein the reaction comprises,
   (1) adding acid to the reaction mixture in a first step and adding base to the reaction mixture in a second step during the reaction;
   or
   (2) adding base to the reaction mixture in a first step and adding acid to the reaction mixture in a second step during the reaction.

2. The method of claim 1, wherein the acid is an organic acid and comprises 1 to 8 C atoms.

3. The method of claim 2, wherein the organic acid is selected from the group consisting of formic acid, acetic acid, propionic acid, oxalic acid, malonic acid, maleic acid, succinic acid, anhydrides of the stated acids, and mixtures thereof.

4. The method of claim 1, wherein the acid is an inorganic acid selected preferably from the group consisting of nitric acid, sulfuric acid, phosphoric acid, hydrochloric acid, boric acid, hydrofluoric acid, and mixtures thereof.

5. The method of claim 1, wherein the reaction is a one-pot reaction.

6. The method of claim 1, wherein the metallic effect pigment is selected from the group consisting of aluminum, iron, zinc, tin, silver, gold, stainless steel, copper, brass (gold bronze), titanium, and mixtures thereof.

7. The method of claim 1, wherein the applied silicon oxide coating is subsequently subjected to surface modification.

8. The method of claim 1, wherein the base is an organic base.

9. The method of claim 8, wherein the organic base is an amine.

10. The method of claim 8, wherein the organic base is selected from the group consisting of dimethylethanolamine (DMEA), monoethanolamine, diethanolamine, triethanolamine, ethylenediamine (EDA), tert-butylamine, monomethylamine, dimethylamine, trimethylamine, monoethylamine, diethylamine, triethylamine, pyridine, pyridine derivative, aniline, aniline derivative, choline, choline derivative, urea, urea derivative, hydrazine derivative, and mixtures thereof.

11. The method of claim 1, wherein the base is an inorganic base.

12. The method of claim 11, wherein the base is selected from the group consisting of ammonia, hydrazine, sodium hydroxide, potassium hydroxide, ammonium hydroxide, ammonium carbonate, ammonium hydrogencarbonate, sodium carbonate, sodium hydrogencarbonate, potassium carbonate, potassium hydrogencarbonate, and mixtures thereof.

13. The method of claim 1, wherein the alkoxysilane is a tetraalkoxysilane.

14. The method of claim 13, wherein the tetraalkoxysilane is at least one of tetraethoxysilane and oligomers of tetraethoxysilane.

* * * * *

UNITED STATES PATENT AND TRADEMARK OFFICE
CERTIFICATE OF CORRECTION

| | | |
|---|---|---|
| PATENT NO. | : 8,900,658 B2 | Page 1 of 1 |
| APPLICATION NO. | : 13/577008 | |
| DATED | : December 2, 2014 | |
| INVENTOR(S) | : Phu Qui Nguyen et al. | |

It is certified that error appears in the above-identified patent and that said Letters Patent is hereby corrected as shown below:

In the Claims

Column 19, Line 39, Claim 1, delete "pigments(s)" and insert -- pigment(s) --

Signed and Sealed this
Seventh Day of April, 2015

Michelle K. Lee
*Director of the United States Patent and Trademark Office*